United States Patent [19]
Coley

[11] 3,769,553
[45] Oct. 30, 1973

[54] PANELBOARD WITH INSULATIVE SNAP-IN SUPPORT MEANS
[75] Inventor: Kenneth R. Coley, Fairfield, Conn.
[73] Assignee: Westinghouse Electric Corporation, Pittsburgh, Pa.
[22] Filed: Nov. 1, 1972
[21] Appl. No.: 302,950

[52] U.S. Cl. .............................. 317/119, 174/71 B
[51] Int. Cl. ............................................. H02b 1/20
[58] Field of Search .................... 174/71 B, 72 B; 317/119, 120

[56] References Cited
UNITED STATES PATENTS
3,371,251  2/1968  Speck ................................. 317/119
2,457,002  12/1948  Spiro ..................................... 174/50

Primary Examiner—Robert K. Schaefer
Assistant Examiner—Gerald P. Tolin
Attorney—A. T. Stratton et al.

[57] ABSTRACT

A panel assembly comprising a pair of bus bar structures and an insulating support structure that supports the bus bar structures in a particular relationship with adequate spacing and insulation between the bus bar structures which are of opposite polarity.

9 Claims, 9 Drawing Figures

PANELBOARD WITH INSULATIVE SNAP-IN SUPPORT MEANS

BACKGROUND OF THE INVENTION

1. Field of the Invention

This invention relates generally to electric distribution systems and more particularly to an electric panel assembly in which bus bars are attached to a rigid support member without the use of separate or external fasteners.

2. Description of the Prior Art

Generally, a panel assembly or load center of the type shown in U.S. Pat. No. 3,349,292 issued to James F. Meacham on Oct. 24, 1967, serves as distribution centers in main electrical circuit to many branch circuits. Panel assemblies are utilized in both one-phase and three-phase insulations wherein bus bars of positive and negative potentials are mounted on a dielectric support structure. Some other panel assemblies of prior construction have the disadvantage of including separate fastening means for fastening the bus bars in place of the support structure, whereby additional cost and inconvenience is required in assembling the panel assemblies.

SUMMARY OF THE INVENTION

A panel assembly is provided comprising an elongated insulating support structure and a pair of elongated bus bars. Each of the bus bars comprises an elongated main body part and a plurality of stab parts extending from the main body part in a spaced relationship spaced lengthwise relative to the main body part. The insulating support structure comprises a plurality of spaced ledge parts at each of two opposite sides thereof. At each of the opposite sides of the insulating support structure all adjacent spaced ledge parts are spaced by a stab-receiving slot. The spaced ledge parts and the stab-receiving slots of the two opposite sides are staggered lengthwise such that each stab-receiving slot at each side of the insulating support structure is opposite a ledge part of the opposite side of the insulating support structure. The pair of bus bars are supported on the opposite sides of the insulating support structure with the spaced stab parts of each bus bar being positioned in the associated slots and with the spaced ledge parts of the associated side of the insulating support structure being positioned over parts of the main body part of the associated bus bar. The stab parts of the pair of bus bars are positioned in an interleaved relationship aligned lengthwise along the insulating support structure. The insulating support structure comprises a pillar portion beneath each of the stab-receiving slots for increased support. Each pillar position and the bus bars comprise cooperating interengaging snap-in parts for retaining the bus bars in the mounted position. The improved panel assembly is expandable to satisfy a number of circuit capacity requirements from eight through 42 circuits with the insulating support structure comprising a maximum of only two different kinds of insulating support members in a manner to be hereinafter specifically described.

The advantage of the panel assembly of this invention is that separate fastening devices for retaining the bus bars in place on the mounting structure are unnecessary, because snap-in fastening means are molded integrally with the support structure. Moreover, the particular configuration of this support structure is such that it includes resilience even where it is composed of a thermal setting resinous material such as a phenolic resin.

DESCRIPTION OF THE PREFERRED EMBODIMENTS

Figure 1:
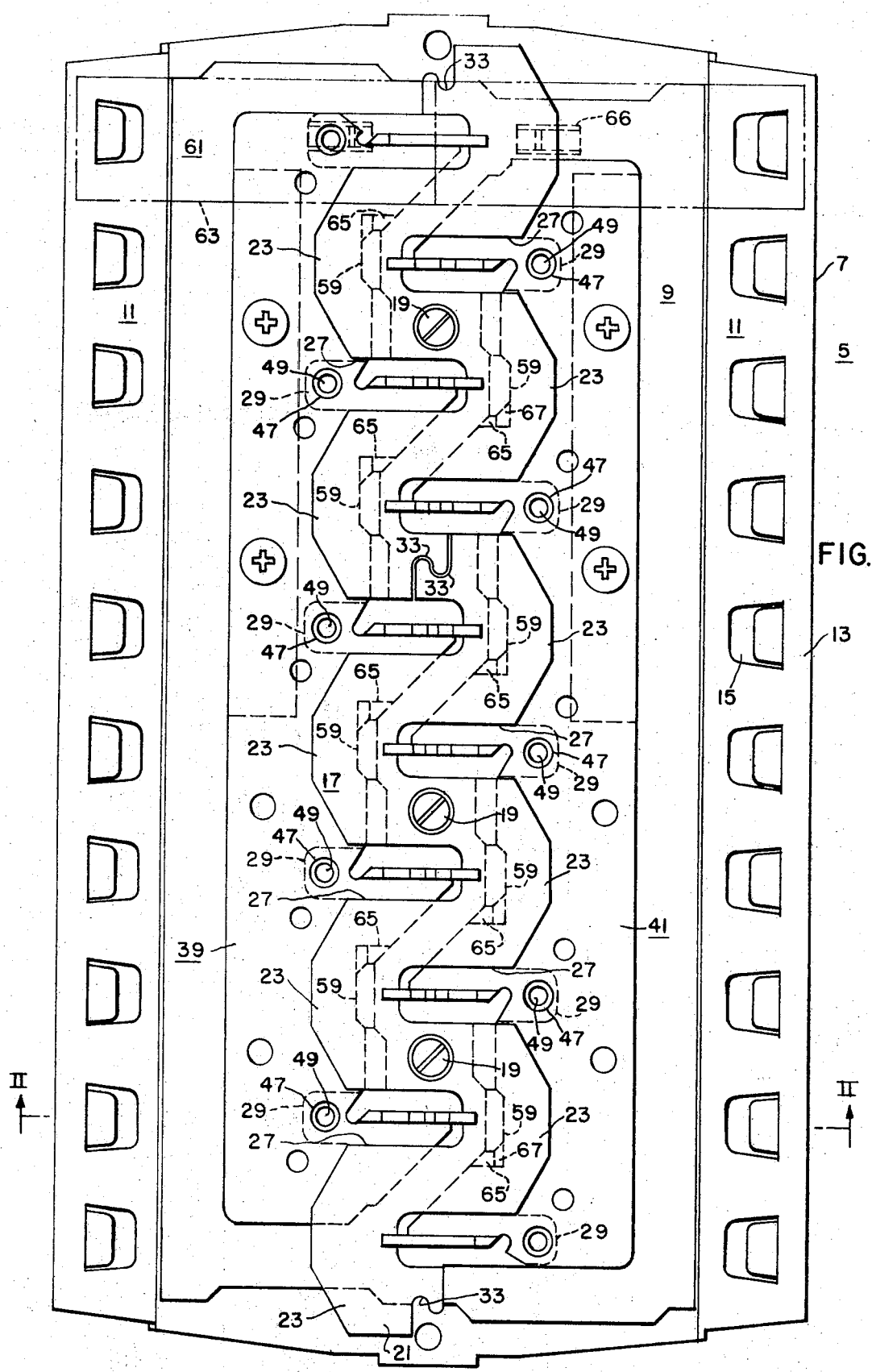
FIG. 1 is a plan view of a panel assembly constructed in accordance with principles of the subject invention.
Figure 7:
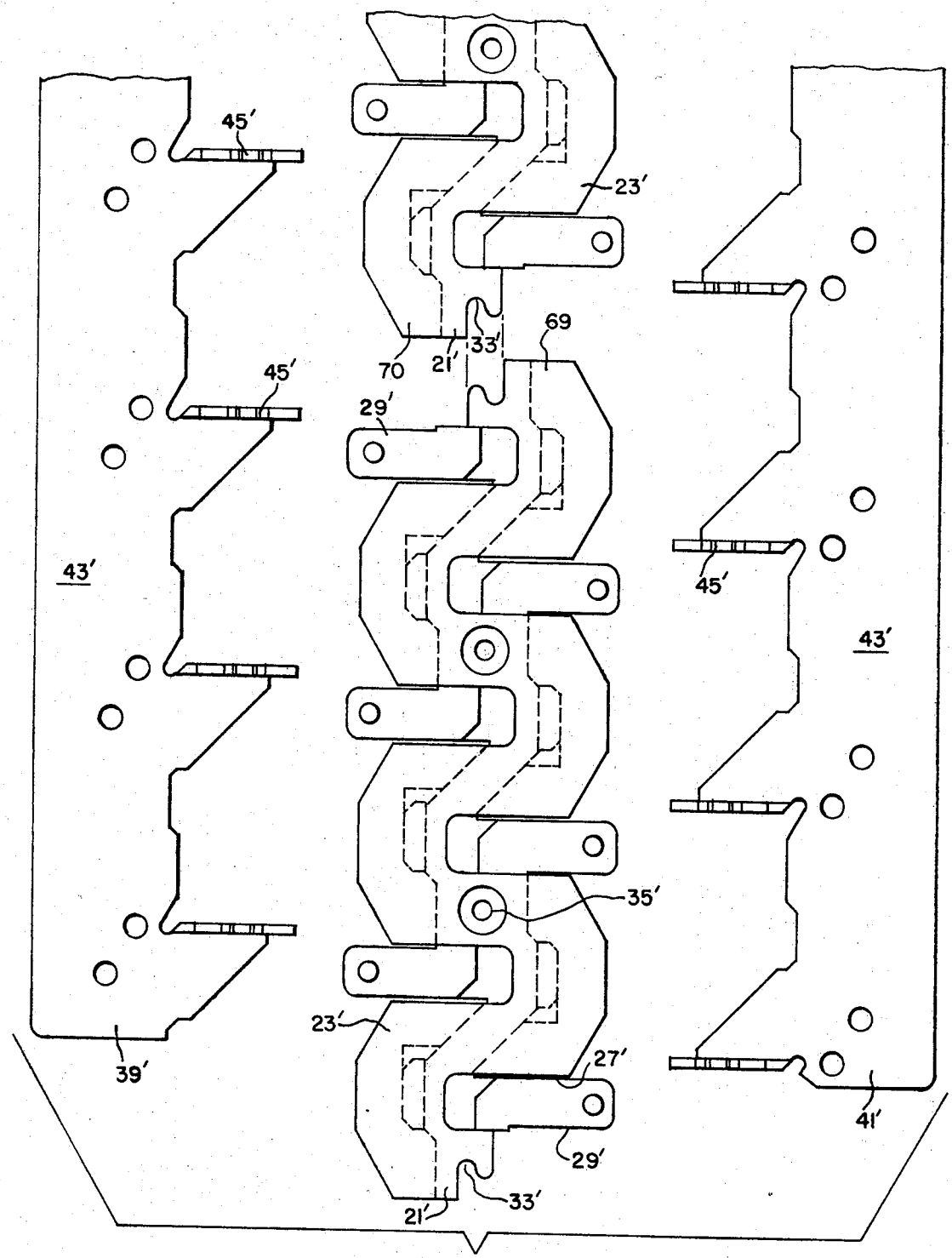
FIG. 7 is a view similar to FIG. 3 of a different bus bar structure and different bus bars having a different circuit capacity from that seen in FIG. 3.

Referring to the drawings, there is shown, in FIGS. 1 and 7, a panel assembly 5 comprising a sheet metal supporting pan 7 that may be supported in a loadcenter or panelboard enclosure in a well known manner. The supporting pan 7 comprises a lower support part 9 and two upper supporting shelf parts 11. Two retaining plate structures 13, each of which comprises a plurality of retaining hooks 15, are fixedly supported on the shelf parts 11 of the supporting pan 7.

Figure 3:
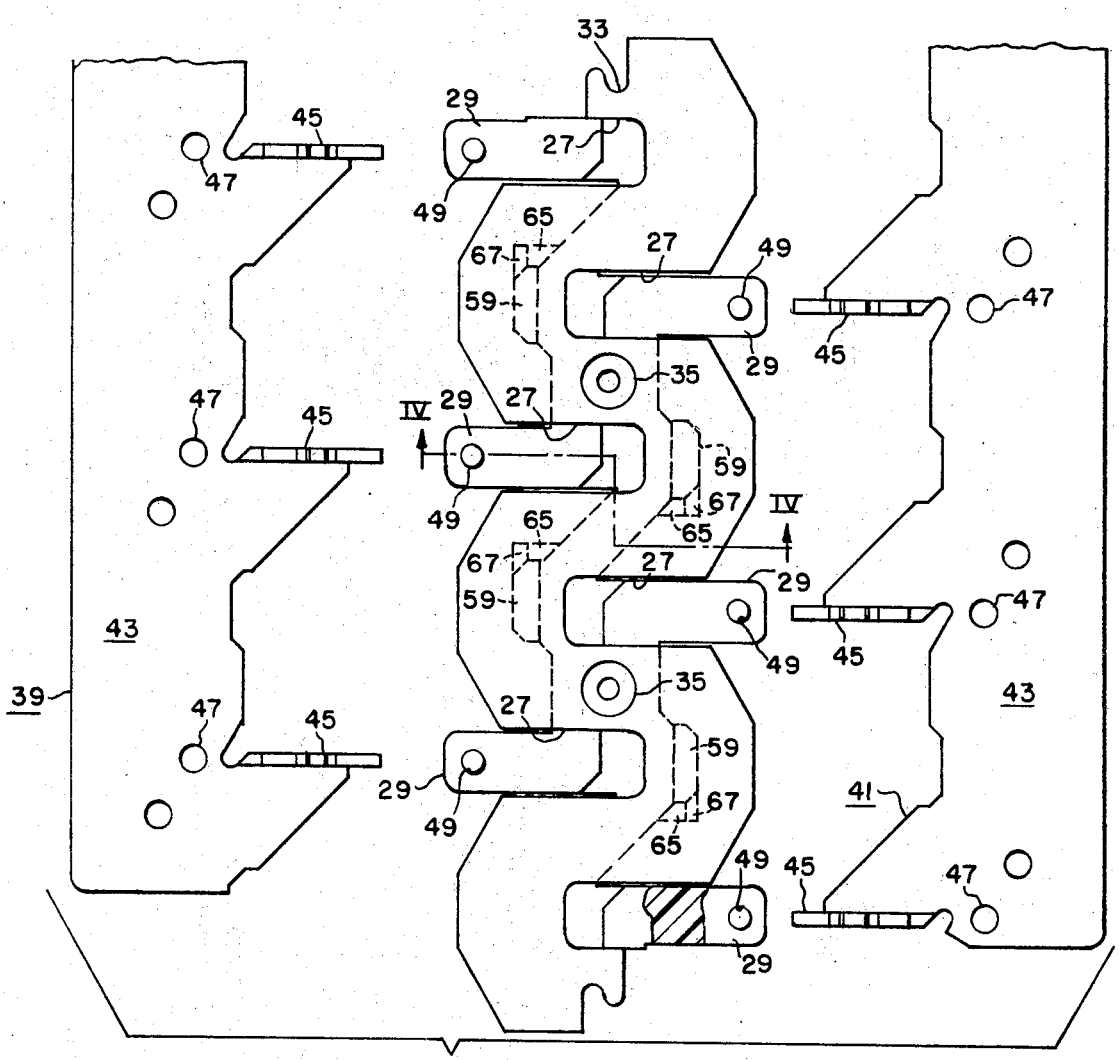
FIG. 3 is an exploded view, with some parts shown in section, of the insulating support structure and bus bars of FIG. 1.

An insulating support structure 17 is secured to the support pan 7 by means of screws 19 that pass through suitable openings in the support structure 17 and that are threaded into the support pan. The support structure 17 is an elongated member molded as an integral unit of an electrically insulating material. It comprises a main body support part 21 extending the length of the structure 17 and a plurality of ledge parts 23 extending outward at the front of the support structure 17 at each of two opposite sides of the main body support part 21. A plurality of transversely extending stab-receiving slots 27 (FIG. 3) are formed at each of the two opposite sides of the support structure 17 such that there is a stab-receiving slot 27 between each of adjacent ledge parts 23 at each side of the support structure 17. As can be seen in FIG. 3, the support 17 is constructed with the spaced ledge parts and the stab-receiving slots of the two opposite sides being staggered lengthwise such that each stab-receiving slot at each side of the insulating support structure 17 is opposite a ledge part 23 of the opposite side of the insulating support structure 17.

The insulating support structure 17 is molded such that there is a transversely extending supporting pillar portion 29 extending from the supporting main body portion 21 under each of the stab-receiving slots 27. The back surfaces of the pillar portions 29 and the back surface of the main body portion 21 are flat surfaces that rest on the pan 7 to support the structure 17. A pair of slots 33 are formed at the opposite ends of the supporting structure 17 for a purpose to be hereinafter described. As can be seen in FIG. 3, openings 35 are provided in the main body supporting part 21 for receiving the mounting screws 19 (FIG. 1).

A pair of bus bars 39 and 41 are supported on the insulating support structure 17 and are composed of electrically conducting material. Each of the bus bars 39 and 41 (FIG. 3) comprises a flat elongated main body portion 43 and a plurality of flat stabs 45 that are bent-over from the main body portion 43 to extend along planes generally normal to the plane of the main body portion 43 in the manner disclosed in FIGS. 2 and 3. Each of the bus bars 39 and 41 is formed with a plurality of spaced apertures 47 in the main body part 43 thereof.

Figure 4:
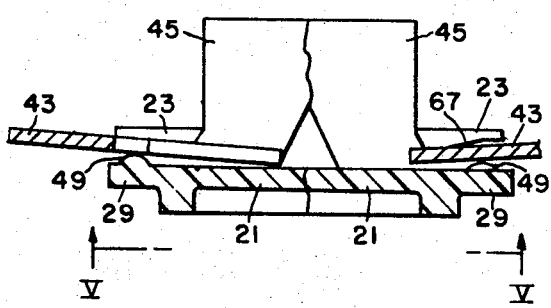
FIG. 4 is a sectional view of the insulating support structure taken generally along the line IV—IV of FIG. 3 with the bus bars of FIG. 3 shown as they are being moved into the mounted position with the ledge parts of the mounted position with the ledge parts of the insulating support member structure flexed upwardly to the position shown in FIG. 3 wherein the ledge parts are resiliently charged to provide a snap-in engagement with the bus bars reach the fully mounted position of FIG. 1.
Figure 5:
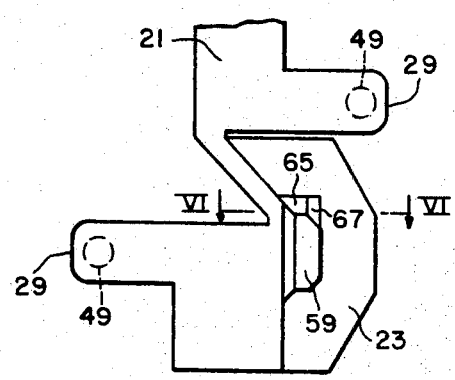
FIG. 5 is a bottom view taken on the line V—V of FIG. 4.
Figure 6:
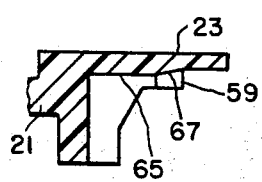
FIG. 6 is a vertical sectional view taken on the line VI—VI of FIG. 5.

In addition, the insulating support structure 17 is provided with a plurality of projections 49. Each projection 49 is located at the other end portion of the pillar portion 29 where each projection is aligned with a corresponding opening 47 in the bus bars 39 and 41. When the bus bars are assembled with the insulating support structure 17, each projection 49 snaps into place within its corresponding opening 47. The insulating support structure 17 is also provided with second projections 59 on the undersurface of the ledge parts 23 which cooperate with notches 63 to align the bus bars 39 and 41 with the support structure 17 upon assembly of these members. Finally, a thickened portion or protrusion 65 is provided on the undersurface of each ledge part 23 adjacent to the projection 59 to assert pressure on the top surface of the bus bars 39 and 41 when the bus bars are assembled on the insulating support structure 17. As shown in FIG. 4, the protrusions 65 are located approximately halfway between the longitudinal axis of the support structure 17 and the projections 59. To facilitate insertion of the bus bars 39 and 41 into their mounted positions within the insulating support structure 17, each protrusion 65 is provided with a beveled surface 67 which confronts the leading edge of the bus bar 39 or 41 as it is inserted into place, thereby causing the ledge parts 23 to flex upwardly slightly during assembly until the several apertures 47 come into alignment with the corresponding projections 59 and snao into place therein.

During the assembly of the panel assembly 5, the retaining structures 13 (FIGS. 1 and 2) are fixedly secured to the supporting pan member 7. The insulating support structure 17, which is molded as an integral unit from an electrically insulating material with some resiliency, such as a thermosetting resin (for example, a phenolic resin), is then secured to the supporting pan 7 by means of the screws 19 (FIG. 1). Thereafter, the two bus bar structures 39 and 41 are moved from the position in which they are seen in FIG. 3 to the supported or mounted position seen in FIG. 1. During this movement of the bus bars 39, 41, each of the stabs 45 moves into the associated stab-receiving slot 27, and in the final positions of the bus bars 39, 41 the stabs 45 are positioned in an interleaved relationship aligned lengthwise along the center portion of the insulating support structure 17 as seen in FIG. 1. The bus bars 39, 41 rest on the flat front surfaces of the pillar portions 29. The insulating support structure 17, and the bus bars 39, 41 are shown in FIG. 4 in a position reached during the mounting operation of the bus bars prior to the time when the bus bars reach the fully mounted position. As the bus bars 39, 41 are moved into position sliding over the front surfaces of the pillar portions 29, the ledge portions 23 flex upward as shown in FIG. 4 spring charging the resilient ledge portions. When the bus bars 39, 41 reach the fully mounted position seen in FIG. 1, the spring charged ledge portions 23 snap downward with the projection 59 moving into the openings 47 in the bus bars 39, 41 to provide an interlocking engagement between the insulating support structure 17 and the bus bars 39, 41 to thereby retain the bus bars in the mounted position without the need of screws or other types of separate fastening members.

When the panel assembly is mounted at an installation a plurality of circuit breakers are mounted on the assembly and connected to the conducting stabs 45 in a well known manner. The circuit breakers, two of which are seen at 61 in FIGS. 1 and 2, may be of the type disclosed in the patent to L. W. Dyer, U.S. Pat. No. 2,677,025, issued Apr. 27, 1954, and assigned to the assignee of the instant case. Each of the circuit breakers 61 comprise an electrically insulating housing 63 having an opening handle 65 extending from the front of the housing, which handle is movable between two operating positions to open and close a pair of contacts enclosed within the housing in a well known manner. Each of the circuit breakers is mounted at line end thereof on the associated conduiting stab 45 by means of a plug-in or clip-on type connecting terminal structure that comprises a pair of resilient conducting terminal parts that resiliently engage the stab at opposite sides of the stab to provide the connection in a well known manner. Each of the circuit breakers 61 is mounted at the other end thereof on the mounting pan 7 with suitable slot means in the circuit breaker housing receiving the associated hook member 15 to retain the load-end of the circuit breaker in place.

Figure 2:
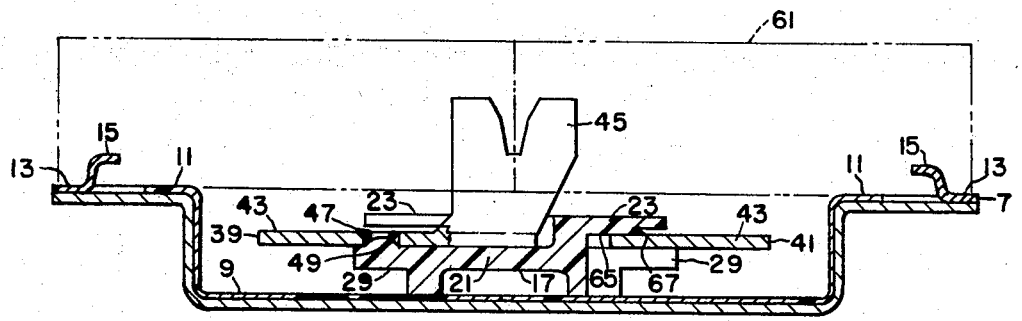
FIG. 2 is a sectional view, taken generally along the line II—II of FIG. 1.

During the mounting operation, the load end of the circuit breaker is first moved into position with the associated hook portion 15, and thereafter the circuit breaker is pivoted down into the fully mounted position seen in FIGS. 1 and 2. Each of the circuit breakers 61 is provided with a well known type of solderless terminal connector at the load end thereof to permit connection of the circuit breaker in an electric circuit. Only two circuit breakers are disclosed in FIG. 1, it being understood that at an installation a separate pair of circuit breakers 61 may be connected to each of the conducting stabs 45. Thus, each of the conducting stabs 45 electrically feeds two circuit breakers in the panel assembly. The bus bars 39, 41, when connected in an electric circuit, are of opposite polarity, and it is necessary to provide adequate insulation and spacing between the bus bars in accordance with electrical standards. It can be seen, with reference to FIG. 1, that each of the ledge parts 23, at each side of the insulating support structure 17, is opposite a stab-receiving slot 27 of the opposite side of the insulating support structure 17 so that each of the stabs 45 is insulated from the main body portion of the opposite bus bar with the ledge part adjacent the stab 45 covering part of the main body portion of the opposite bus bar. The insulating support structure 17 and bus bars 39, 41 are so constructed and arranged that the bus bars, which are of opposite polarity, are adequately spaced and insulated from each other.

Figure 8:
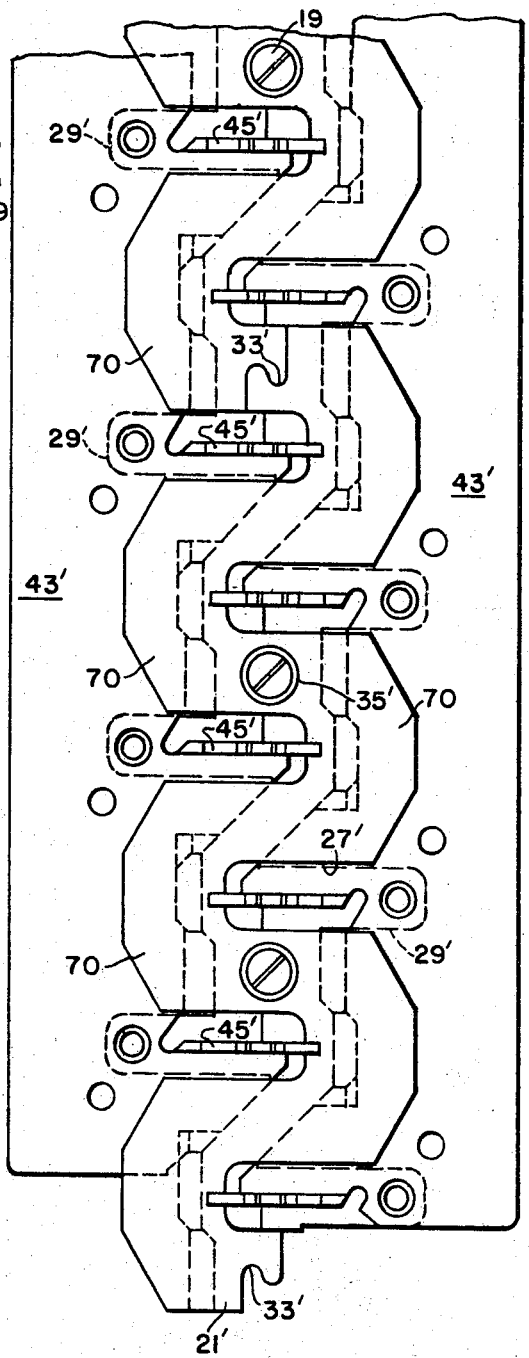
FIG. 8 is a plan view of the parts of FIG. 7 in the assembled position.

The panel assembly illustrated in FIGS. 1 and 3 is a 12-circuit assembly. With two circuit breakers 61 connected to each of the six stabs 45, a total of 12 circuit breakers can be mounted on the assembly to feed and control 12 circuits drawn off of the two bus bars. The insulating support structure and bus bars for a 16-circuit assembly are illustrated in FIGS. 7 and 8. Since, except for differences that will be hereinafter described, the parts of FIGS. 7 and 8 are like those hereinbefore described with reference to FIGS. 3 and 1, primed reference characters are used in FIGS. 7 and 8 to identify the parts that are like the parts of FIGS. 3 and 1. Different reference characters (69 and 70) are used to indicate that the insulating support structure 17' of FIG. 7 comprises two insulating support members 69 and 70 rather than a single insulating support member as seen in FIG. 3. As can be seen in FIG. 7, each of the bus bars 39' and 41' comprises four stabs 45', and the two insulating support members 69, 70 cooperate to form the insulating support structure 17' that is provided with eight stab-receiving slots 27' for receiving the eight bus bar stabs 45'.

During the mounting operation of the insulating support structure 17', the two insulating support members 69, 70 are moved into the position seen in FIG. 8 with the slot portions 33' cooperating in the manner disclosed to provide an elongated insulating support structure 17' having the eight stab-receiving slots 27' therein. Screws 19' are passed through openings 35' in the insulating support structure 17' to secure the insulating support structure 17' to a mounting pan in the same manner hereinbefore described. Thereafter, the two bus bars 39', 41' are moved into the mounting position seen in FIG. 8 in the same manner as was hereinbefore described with reference to FIGS. 1–4. The panel assembly constructed with the parts of FIGS. 7 and 8 is a 16-circuit assembly with eight stabs 45' being positioned in an interleaved relationship aligned lengthwise along the insulating support structure 17' for receiving 16 circuit breakers that would be connected to the assembly with each stab 45' feeding two circuit breakers in the manner described with the reference to FIGS. 1 and 2.

Single phase panel assemblies of the type herein described are generally offered in different circuit denominations. Manufactures may supply panel assemblies comprising eight, 12, 16, 20, 24, 28, 32, 36, 40 or 42 circuit breakers. In order to minimize the number of parts required per assembly, as sell as mold costs, the two different types of insulating support members disclosed in FIGS. 3 and 7 are constructed such that they can be used either along or in combination to construct any of the above-mentioned panel assemblies. As can be understood with reference to FIG. 7, each of the unitary molded insulating support members 69 and 70 comprises four stab-receiving slots 27' for receiving four bus bar stabs to supply eight circuits. In order to identify these insulating support members 69, 70 for the purpose of setting forth a table below, each of these insulating support members may be referred to as an A-block. As was previously described, the unitary molded insulating support member 17 of FIG. 3 comprises six stab-receiving slots 27 for receiving six bus bar stabs to supply 12 circuits. In order to identify this insulating support member for the purpose of the table below, the insulating support member 17 of FIG. 3 may be referred to as a B block. Two or more of the blocks may be secured together in the same manner hereinbefore described with reference to FIGS. 7 and 8. The following table illustrates how the required circuit denominations may be supplied with the use of one or more of the blocks A and B:

| No. of Circuits | No. of A Blocks | No. of B Blocks |
| --- | --- | --- |
| 8 | 1 | 0 |
| 12 | 0 | 1 |
| 16 | 2 | 0 |
| 20 | 1 | 1 |
| 24 | 0 | 2 |
| 28 | 2 | 1 |
| 32 | 1 | 2 |
| 36 | 0 | 3 |
| 40 | 2 | 2 |
| 42 | 1 | 3 |

Figure 9:
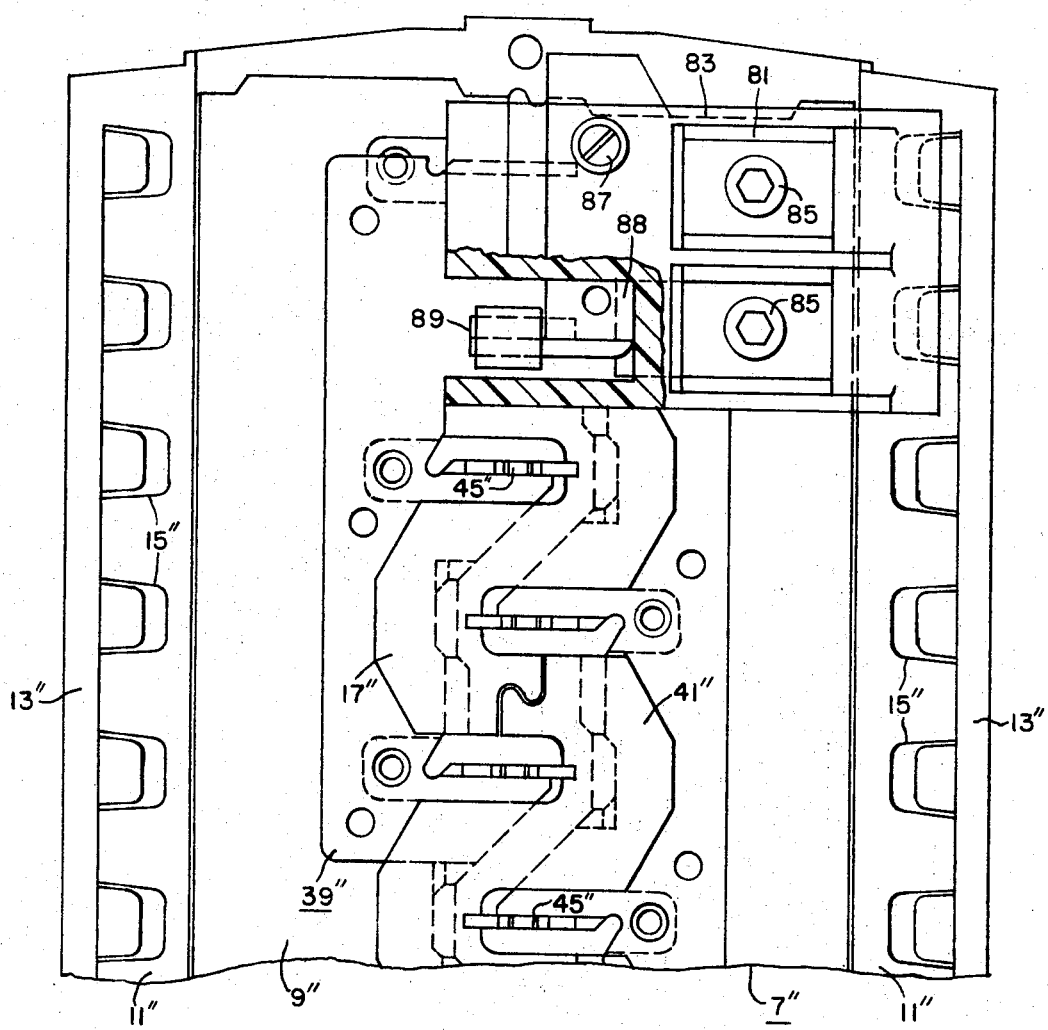
FIG. 9 is a plan view illustrating another embodiment of the invention.

Another embodiment of the invention is disclosed in FIG. 9. In FIG. 9, a supporting pan 7', similar to the one disclosed in FIG. 1, is provided. Double primed reference characters are used in FIG. 9 in order to identify those parts that are like the parts disclosed in FIG. 1. An insulating support structure 17'', identical to that disclosed in FIG. 1 is mounted on the supporting pan 7''. Two bus bars 39'' and 41'' are supported on the insulating support structure 17'' in the manner previously described with reference to FIGS. 1 and 3. The bus bars 39'' and 41'' differ from the bus bars 39 and 41 only in that the upper ends of the bus bars terminate in the manner disclosed since these bus bars need not extend upward to engage solderless terminal connectors of the type disclosed in FIG. 1. Instead of energizing the bus bars 39'' and 41'' through solderless terminal connectors of the type disclosed at 55 in FIG. 1, a plug-in structure indicated generally at 81 is provided. The plug-in lug structure 81 comprises an insulating housing structure 83 having two solderless terminal connectors 85 supported in cavities in the housing 83. Two screws 87 connect two conducting straps 88 to the housing 83. The conductors 88 connect the terminal conductors 85 with two well known types of clip-on terminals 89 that are mounted on the insulating housing 83 and that clip onto the upper two stabs of the bus bars 39'', 41''. The plug-in lug structure 81 is mounted on the panel assembly in the same manner as the circuit breakers. The plug-in lug structure is first hooked under the two hooks 15'' and then pivoted down into the position seen in FIG. 9 with the two clip-on type terminal structures clipping onto the upper two stabs of the bus bars 39'', 41''. At the installation, two conducting wires are brought into the panel assembly and connected to the solderless terminal connectors 85 in a well known manner to connect the two bus bars 39'' and 41'' to the conducting wires to thereby provide for energization of the bus bars. In the embodiment disclosed in FIG. 9, the insulating support structure 17 supports the bus bars having a total of six stabs, and the upper two stabs are used for energizing the bus bars through the plug-in lug structure. This leaves four stabs available to receive eight circuit breakers in the same manner hereinbefore described. Thus, in this embodiment, the one B-block is used for an eight circuit assembly. The following table is set forth in order to illustrate the combination of the previously described A- and B-blocks that would be used for the required circuit denominations when the plug-in lug structure 81 is used to energize the bus bars:

| No. of Circuits | Quantity of A Blocks | Quantity of B Blocks |
|---|---|---|
| 8 | 0 | 1 |
| 12 | 2 | 0 |
| 16 | 1 | 1 |
| 20 | 0 | 2 |
| 24 | 2 | 1 |
| 28 | 1 | 2 |
| 32 | 0 | 3 |
| 36 | 2 | 2 |
| 40 | 1 | 3 |
| 42 | 0 | 4 |

While the invention has been disclosed in accordance with the provisions of the patent statutes, it is to be understood that various changes in the structural details and arrangement of parts thereof may be made without departing from some of the essential features of the invention. It is desired, therefore, that the language of the appended claims be given as reasonably broad an interpretation as is permitted by the prior art.

What is claimed is:

1. A panel assembly comprising an elongated insulating support structure and a pair of elongated bus bars, each bus bar comprising an elongated body portion and a plurality of stabs extending from the body portion in a longitudinally spaced relationship, the body portion having opening means therein, the insulating support structure comprising a plurality of longitudinally spaced ledge parts at each of two opposite sides thereof, a plurality of transversely extending, longitudinally spaced, pillar portions extending from each side of the body portion of the insulating support structure, at each of said two opposite sides of said insulating support structure all adjacent spaced ledge parts being spaced by a stab-receiving slot, said ledge parts and said stab-receiving slots of said two opposite sides being staggered lengthwise such that each stab-receiving slot at each side of said insulating support structure is opposite a ledge part of the opposite side of said insulating support structure, said pair of bus bars being supported on said opposite sides of said insulating support structure with the spaced stabs of each bus bar being positioned in the associated slots and with the spaced ledge parts of the associated side being positioned over parts of the main body part of the associated bus bars, said stabs of said bair of bus bars being positioned in an interleaved relationship aligned lengthwise along siad insulating support structure, said insulating support structure comprising support-surface means at each of said two opposite sides thereof, each of said bus bars being supported over the associated support-surface means resting on the associated support-surface means, and projection means on the top side of said pillar portion cooperating with the opening means on said body portions of said bus bars to retain said bus bars in the mounted position on said insulating support structure.

2. The panel assembly according to claim 1, said insulating support structure comprising an integral molded unitary member.

3. The panel assembly according to claim 1, said insulating support structure comprising a plurality of molded insulating members supported in an end-to-end relationship.

4. The panel assembly according to claim 1, said projection means and said opening means comprising cooperating interengaging snap-in parts for retaining said bus bars in the mounted position on said insulating support structure.

5. The panel assembly according to claim 1, said pillar portions comprising support-surface means at each of said two opposite sides thereof, each of said bus bars being supported on the associated support-surface means, said parts comprising projection means, the opening means of each of said bus bars being at the main body part thereof, and said projection means being positioned in said opening means of said bus bars to retain said bus bars in the mounted position on said insulating support structure.

6. The panel assembly according to claim 5, said insulating support structure and said bus bars being constructed such that as said bus bars moved into the mounted position thereof said pillar positions are flexed in a direction away from said support-surface means and when said bus bars reach the fully mounted position thereof said projection means will be aligned with said opening means whereby said flexed pillar portion means will uniflex moving said projection means into said opening means to maintain said bus bars in the mounted position on said insulating support structure.

7. The panel assembly according to claim 6, said pillar portion being under the associated stab-receiving slot to provide a support surface under each of said stabs.

8. The panel assembly according to claim 6, said pillar portion being under each of said slots, said support-surface means comprising the front surfaces of said pillar portions, the thickness of the main body portion of each bus bars being a dimension greater than the dimension between the associated projection means and the associated support-surface means whereby as said bus bars are moved toward the mounted position between the associated ledge parts and the associated support-surface means said ledge parts are flexed generally away from said support surface means and when said bus bars reach the fully mounted position thereof said projections become aligned with said openings whereupon said flexed ledge parts unflex moving said projection means into the associated opening means to thereby maintain said bus bars in the mounted position on said insulating support structure.

9. The panel assembly according to claim 8, said ledge parts having second support surfaces on the side of the bus bars opposite that of said support-surfaces of the pillar portions, and said second support surfaces having protrusion means engageable with the bus bars.

* * * * *